United States Patent
Ramaswamy et al.

(10) Patent No.: US 6,832,082 B1
(45) Date of Patent: Dec. 14, 2004

(54) INITIALIZATION OF HANDSETS IN A MULTI-LINE WIRELESS PHONE SYSTEM FOR SECURE COMMUNICATIONS

(75) Inventors: Kumar Ramaswamy, Indianapolis, IN (US); Paul Gothard Knutson, Indianapolis, IN (US); Maneck Behram Kapadia, Indianapolis, IN (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/581,268

(22) PCT Filed: Sep. 1, 1998

(86) PCT No.: PCT/US98/18059
§ 371 (c)(1),
(2), (4) Date: Nov. 10, 2000

(87) PCT Pub. No.: WO99/31859
PCT Pub. Date: Jun. 24, 1999

Related U.S. Application Data

(60) Provisional application No. 60/069,684, filed on Dec. 12, 1997.

(51) Int. Cl.[7] .......................... H04M 1/66; H04M 1/68; H04M 3/16
(52) U.S. Cl. .................... 455/411; 455/410; 455/435.1; 455/500; 455/502; 455/550.1; 455/551; 455/555
(58) Field of Search .................. 455/460–462, 455/554.1, 555, 410–411, 426.1, 435.1, 464–465, 41.1–41.2, 74.1, 88, 550.1–551, 500, 502; 379/354–357

(56) References Cited

U.S. PATENT DOCUMENTS

| | | | |
|---|---|---|---|
| 4,639,550 A | * 1/1987 | Yamagawa et al. | 455/411 |
| 4,736,404 A | * 4/1988 | Anglikowski et al. | 455/411 |
| 4,864,599 A | * 9/1989 | Saegusa et al. | 455/411 |
| 4,905,272 A | * 2/1990 | Van de Mortel et al. | 455/410 |
| 4,982,401 A | * 1/1991 | Box | 714/701 |
| 5,353,341 A | * 10/1994 | Gillis et al. | 455/464 |
| 5,371,783 A | * 12/1994 | Rose et al. | 455/464 |
| 5,495,520 A | 2/1996 | Kojima | |
| 5,592,536 A | * 1/1997 | Parkerson et al. | 455/462 |
| 5,625,888 A | * 4/1997 | Ruther et al. | 455/462 |

FOREIGN PATENT DOCUMENTS

| | | | |
|---|---|---|---|
| EP | 301573 | 7/1988 | H04M/1/72 |
| EP | 304998 | 3/1989 | H04M/1/72 |
| GB | 2254225 | * 9/1992 | H04M/1/66 |
| JP | 61144938 | * 7/1986 | H04K/1/04 |

* cited by examiner

*Primary Examiner*—Lee Nguyen
*Assistant Examiner*—Tuan Tran
(74) *Attorney, Agent, or Firm*—Joseph S. Tripoli; Joseph J. Kolodka

(57) ABSTRACT

A wireless telephone system, having one or more wireless handsets and a base unit. Each handset has a handset transceiver, and the base unit has a base transceiver and a handset docking station, which has a wired interface. The base unit digitally communicates over an RF channel with a handset via its handset transceiver only if the handset has previously been initialized by the base unit. The handset is initialized via the wired interface when it is physically docked in the docking station.

12 Claims, 3 Drawing Sheets

INITIALIZATION OF HANDSETS IN A MULTI-LINE WIRELESS PHONE SYSTEM FOR SECURE COMMUNICATIONS

This application claims the benefit of Provisional application Ser. No. 60/064,684, filed Dec. 12, 1997.

BACKGROUND OF THE INVENTION

1. Field of the Invention

The present invention relates to multi-line wireless telephone systems and, in particular, to providing secure communications in a time-division multiplexed (TDM) wireless telephone system.

2. Description of the Related Art

The use of telephones and telephone systems, including wireless telephone systems, is widespread. In wireless telephone systems, a cordless or wireless telephone handset unit communicates via either analog or digital radio signals with a base unit, which is typically connected via a standard telephone line to an external telephone network. In this manner, a user may employ the wireless handset to engage in a telephone call with another user through the base unit and the telephone network.

Multi-line wireless telephone systems are in use in various situations, such as businesses with many telephone users. Such systems employ a handset that communicates with up to N handsets simultaneously, typically with digital communications schemes, such as a spread-spectrum, time division multiple access (TDMA). In a TDMA system, a single RF channel is used, and each handset transmits and receives data during a dedicated time slice or slot within an overall cycle or epoch. It is desirable to provide various features, such as private branch exchange (PBX) features and capabilities, in a multi-line wireless telephone system.

One problem that may be encountered in such situations is breach of security. For example, an unauthorized third party may use a "bootleg" wireless handset to communicate via the base unit. Without adequate security, these and other types of security breaches may occur.

European Pat. App. No. 0 034 998 (Philips N V), March 1989 describes a wireless telephone system in which a base station stores an assigned security address code for a plurality of handsets, and the handsets also store the code assigned to each handset and transmitted to the handset by the base unit during recharging. U.S. Pat. No. 5,625,888 (Rüther et al.), 29 Apr. 1997 describes a process for combining transmitting/receiving devices of a cordless communication system to form a communication unit U.S. Pat. No. 5,371,783 (Rose et al.), 6 Dec. 1994 describes a method for continually monitoring the status of an RF link. European Pat. App. No. 0 301 573 (Nippon Electric Co.), 1 Feb. 1989 describes registration of new cordless telephones to an existing system.

SUMMARY

A wireless telephone system, having one or more wireless handsets and a base unit. Each handset has a handset transceiver, and the base unit has a base transceiver and a handset docking station, which has a wired interface. The base unit digitally communicates over an RF channel with a handset via its handset transceiver only if the handset has previously been initialized by the base unit. The handset is initialized via the wired interface when it is physically docked in the docking station.

DESCRIPTION OF THE PREFERRED EMBODIMENT

Figures 1, 2:
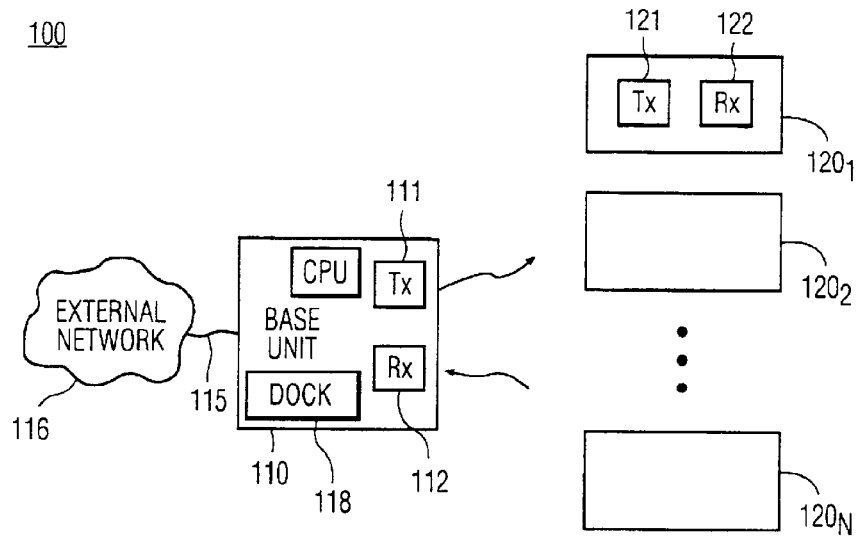
FIG. 1 is a block diagram of TDMA multi-line wireless telephone system for initializing wireless handsets of the system, in accordance with an embodiment of the present invention.
FIG. 2 is a schematic representation of the message format for an initialization message exchange between the base unit and a handset of the telephone system of FIG. 1 via a wired link, for initializing the handset, in accordance with an embodiment of the present invention.

Referring now to FIG. 1, there is shown a block diagram of spread spectrum TDMA multi-line digital wireless telephone system 100, in accordance with an embodiment of the present invention. TDMA system 100 comprises a base unit 110, which has receiver and transmitter units 112 and 111, respectively, and is coupled to external telephone network 116 via telephone line(s) 115. Base unit 110 also comprises docking station 118, for receiving a wireless handset and providing a wired interface between base unit 110 and the handset. In addition, base unit 110 also has a controller/microprocessor 113 for controlling and monitoring the overall functions of the base unit 110.

System 100 also comprises N wireless handsets $120_1$, $120_2$, . . . $120_N$. Each has a transmitter and receiver unit (transceiver), such as transmitter 121 and receiver 122 of handset $120_1$. In one embodiment, receiver unit 112 comprises N logical receivers, and transmitter unit 111 comprises N logical transmitters, so that receiver and transmitter units 112 and 111 provide N logical transceiver units, one for each of N wireless handsets. At any given time, M handsets ($0 \leq M \leq N$) are operating or active (i.e., in the process of conducting a telephone call).

The telephone system provided by system 100 preferably operates in the 900 MHz unlicensed band, and preferably provides features like that of a small PBX, in conjunction with PC 140. In one embodiment, system 100 employs a combination of time division multiplexing (TDM), such as TDMA, and frequency band selection to overcome interfering sources and to maintain reliable links between the base-station and the handsets. In a digital TDMA scheme, each handset only transmits or receives data during its own "time slice" or slot. System 100 thus provides a wireless network between the base station 110 and each handset $120_i (1 \leq i \leq N)$. In one embodiment, N=4, so that system 100 comprises a maximum of 4 wireless handsets, each having unique time slots in the TDMA epoch dedicated thereto.

As explained above, lack or breach of security in such a system is undesirable. Therefore, the telephone system of the present invention is configured to minimize this problem and to provide secure and robust communications between handsets and the base unit. In the present invention, the base unit 110 is configured so that it will communicate only with handsets that are able to provide certain unique identifier (ID) information, or security code. This ID information may include information such as the slot number assigned to the handset (e.g., one of numbers 1–4 in a 4-line, 4-slot, 4-handset system), as well as the handset serial number and/or the base serial number (or security codes based on the serial number), and the like. Only handsets $120_i$ that have been initialized by base unit 110 will be able to provide this information to the base unit 110; all non-initialized handsets will therefore not be able to communicate as part of the telephone system 100.

In an alternative embodiment, in addition to the use of security codes such as the serial number, and slot number, a user-programmable scrambler code is employed. In this embodiment, during initialization, the user of the handset is prompted to enter a random scrambler seed. This scrambler seed is then stored in both handset and base unit, and is used to scramble all future TDMA communications between the two. Since only the initialized handset and the base unit know the scrambler seed, an unauthorized handset or other transceiver device will be unable to eavesdrop on the channel or use the handset's slot. Thus, the user-programmable scrambler provides an extra layer of security. In an alternative embodiment, the scrambler code or seed may be selected automatically by the base unit and/or handset, without prompting the human user for input.

System 100 is configured so that base unit 110 has a physical docking station 118 or receptacle/port into which a non-initialized handset $120_i$ may be physically placed, to provide a wired link and interface between the handset $120_i$ and base unit 110. The handset is then initialized by the base unit via the wired link. Because the physical location of the base unit and its docking station or port may be controlled and access thereto limited to authorized persons, and because a handset must be physically docked to the docking station in order to engage in initialization, only an authorized person will be able to initialize a handset. Therefore, in the present invention, only handsets that have been initialized by the handset via the wired link, as a result of actions of an authorized user, will be able to engage in telephone communications with the telephone system, thus providing communication security. The present invention is described in further detail below, with reference to FIGS. 2–4.

Referring now to FIG. 2, there is shown a schematic representation of the message format 200 for an initialization message exchange between the base unit 110 and a handset $120_i$ of the telephone system 100 of FIG. 1 via a wired link, for initializing the handset $120_i$, in accordance with an embodiment of the present invention. Message format 200 comprises a plurality of fields 201–209 for the exchange of information between base unit 110 and a handset $120_i$ via the wired link provided by port 118, which are exchanged in order to initialize the handset. Messages sent to a docked handset $120_i$ from base unit 110 have message format 200, as do messages sent to base unit 110 from a docked handset $120_i$. Port 118 may also double as the recharging port or cradle into which a handset may be placed to recharge its battery.

Whenever a non-initialized handset $120_i$ is placed in port 118 and is to be initialized, the base unit 110 provides information to the handset, and vice-versa, to initialize the handset so that future TDMA communication may be conducted. In one embodiment, this information includes a security code or D 205, a slot number 204, and a scrambler seed 207. In one embodiment, the security code is based on the serial number of the handset, and is preferably a 32 bit number. The security code may be identical to the serial number, or a part or subset thereof. In an alternative embodiment, the security code is based on the serial number for the base unit, instead of or in addition to that of the handset. The security code is used to authenticate the handset every time any messages are to be exchanged between the base and a handset. In addition to the time slot mechanism, this security code provides a secure exchange of messages from the base to the handset.

The slot number for the handset is a 3 bit number, which is assigned by base unit 110, and transmitted via the wired link to the handset. The slot number is a unique time slot number, which distinguishes handset $120_i$ from other handsets in system 100. The scrambler seed is an 8-bit number, also based on the serial number of the base unit, or, alternatively, user programmable through a serial computer interface or other input (e.g. the keypad of the wireless phone), and is used to generate the code that randomizes the spectrum of transmitted information. Since such encoding employs a deterministic mapping, which is known only to the transceivers of the handset and base unit, it can provide additional security, as described above.

Message format is, in one embodiment, a 72-bit field 200 having an unused field 208 for future expansion as shown in FIG. 2. Message number field 201 is a 4-bit field, modulo generated at each end of a transmission, which helps keep track of the state of the other end. This field is also used for positive acknowledgments. Message type field 202 is a 4-bit field, used to signal different types of messages that can possibly be exchanged between base and handsets. New/existing field 203 is a 1-bit field that indicates whether the handset is a new handset or existing handset, where 0=new handset. For packets originating from base unit 110, this field is always set to 0.

As described previously, local number field 204 is a 3-bit field that indicates the local (slot) number assigned to an existing handset. This number is ignored if new/existing field 203 is set to 0. 32-Bit ID field 205 indicates the security code or ID, which is derived from the factory designated ID for handset $120_i$. This will form the basis for secure communications between the base and handsets registered with the base (i.e., initialized). A 5-bit ack message field 206 contains the 4-bit message number that is being acknowledged, plus an ack bit. In this format, bits 0–3 represent the message number being acknowledged, and bit 4 represents negative ack if 0, and positive ack if 1. The generation of the acknowledgment is based on the CRC check done at the receiving end. Scrambler seed field 207 is an 8-bit field used to seed the scrambler in the RF link. It forms an additional layer of security. This may be default generated from the factory code or programmed through the serial computer interface by a user. CRC code field 209 is an 8-bit cyclic redundancy check code used for error detection and correction.

Figure 3:
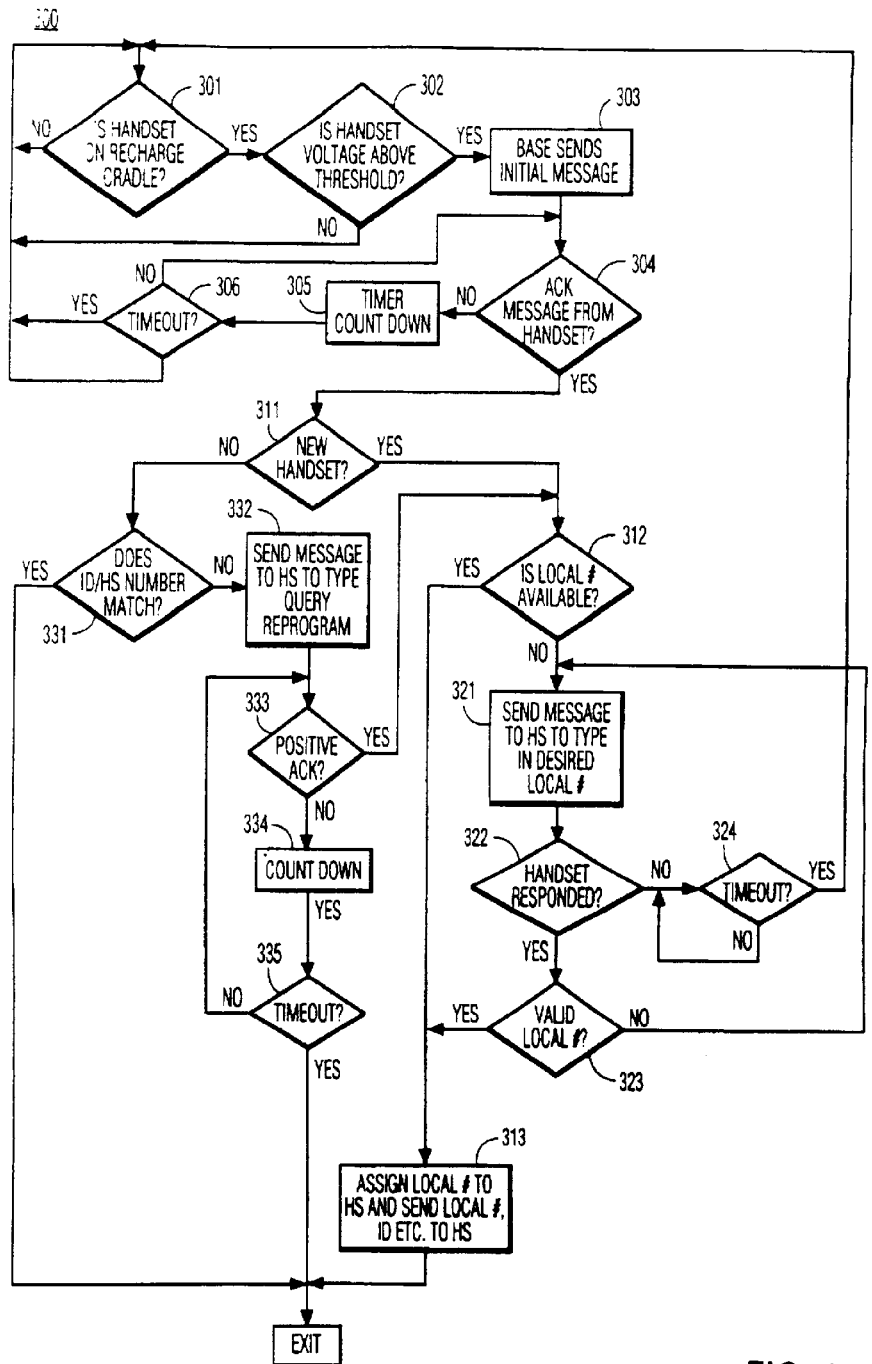
FIG. 3 is a flow diagram illustrating the handset initialization performed by the system of FIG. 1, from the point of view of the base station, in accordance with an embodiment of the present invention.

Referring now to FIG. 3, there is shown a flow diagram 300 illustrating the handset $120_i$ initialization performed by system 100 of FIG. 1 under the control of CPU 113, from the point of view of base station 110, in accordance with an embodiment of the present invention. A handset placed or "docked" into port 118 may be already initialized and docked only for recharging. Alternatively, a non-initialized handset (i.e., either a "new" handset that has never been initialized, or a handset previously initialized for a different base unit) may be docked in port 118 in order to initialize the handset for base unit 110. Additionally, an already-initialized handset may be docked in port 118 in order to re-program or change some of the initialization parameters, i.e. to re-initialize the handset. In the latter cases, the handset may still need recharging.

Thus, base unit 110 first polls the relevant I/O device to detect the presence of the handset on the recharge cradle, i.e. port 118 (step 301). When a handset $120_i$ is docked in port 118 (i.e., the recharge cradle), base unit 110 first checks to see if the voltage level of the battery of handset $120_i$ is above a certain threshold that would permit normal functioning of the handset (step 302). If not, no further processing steps take place until the handset recharges to a sufficient voltage.

Once the threshold voltage requirement is satisfied (step 302), base unit 110 initiates the messaging protocol, in accordance with message format 200, by sending the initial message through the wired interface of port 118 to the handset $120_i$ (step 303). This message is a sign on message which is indicated in the message type field 202 with 0. This starts a sequence of events that are described from the viewpoint of base unit 110 in FIG. 3 and from the viewpoint of handset $120_i$ in FIG. 4. All messages exchanged between the handset and base are asynchronous in nature. The general goal of this procedure is to either allow for a normal recharge or to initialize a non-initialized handset. In the initial message, base unit 110 fills in the following fields: message number field 201, message type filed 202 (where sign on message =0), and the CRC field 209. (If the CRC does not match at the handset, it sends a negative acknowledge back to base unit 110 with the message number, in which case base unit 110 sends a retransmit message to the handset (not shown in FIG. 3). All messages with CRC need acknowledgment even where not indicated in FIG. 3.)

At this point, base unit 110 expects an acknowledge from handset $120_i$ (step 304). If an acknowledge is not received before a timer times out, the procedure starts again (steps 305, 306, 301). If an acknowledge is received before time out (step 304), then base unit 110 can determine whether the docked handset is "new" or has already been initialized (step 311). Handset $120_i$ at step 311 may have one of 3 states: it may be a new handset, it may be already initialized by base unit 110, or it may have been initialized previously by a different base unit.

In case the handset's message indicates a new handset (in which case the handset's message contains the handset's ID in field 205), the base needs to check if it has a local number or slot available (step 312). For example, in a 4-handset system, if 4 handsets are already initialized and thus registered with base unit 110, no slot will be available. If the base unit 110 has an available local number, then the base unit 110 will assign it to the handset by updating the message fields (step 313). In this case, base unit 110 fills out the following fields for the message: message number field 201, message type field 202, unique system ID field 205, local slot number assignment field 204, scrambler seed field 207, and CRC field 209. In this case, ID field 205 contains the serial number of base unit 110.

If it is determined that handset $120_i$ is new, but there is no slot available (step 312), base unit 110 assumes that the user is trying to replace an existing handset with handset $120_i$. In this case, the user is prompted to provide information about what local number needs to be replaced. This is accomplished by a message sent from the base to the handset which then displays a Local Number request and an audio warning (step 321). Once a response with a valid slot number is received from the handset as a result of this query (steps 322, 323), base unit 110 completes the local slot number assignment and fills out the specified fields for the message (step 313). If no response is received from the handset, a timeout is issued and the base starts at the top of its execution (step 324).

When handset $120_i$ is not a new handset (step 311), base unit 110 checks the 32 bit ID, local number, and scrambler seed transmitted by handset $120_i$. If these numbers match the information stored in base unit 110's memory, the base program exits (step 331). If there is a mismatch, then the base sends a reprogram message (message type =8) to the handset (steps 331, 332). This message is filled in the following fields: message number field 201, message type field 202, and CRC field 209.

If base unit 110 receives a positive acknowledgment, it follows the processing chain as if it is dealing with a new handset, so that it can re-initialize the handset (steps 333, 312). In case it receives a negative acknowledge, or times out, it exits the service routine (steps 333, 334, 335).

Figure 4:
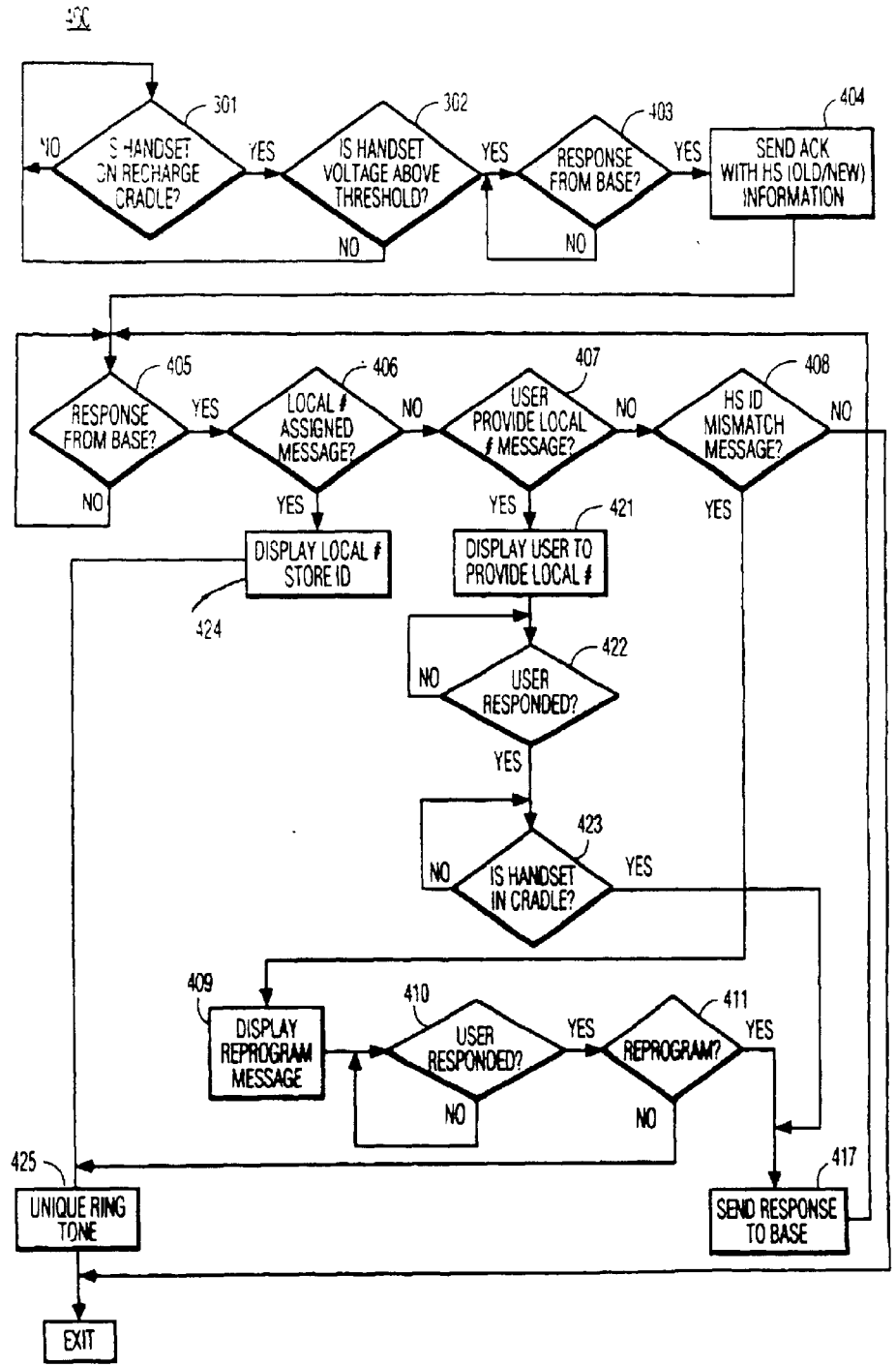
FIG. 4 is a flow diagram illustrating the handset initialization performed by the system of FIG. 1, from the point of view of the handset being initialized, in accordance with an embodiment of the present invention.

Referring now to FIG. 4, there is shown a flow diagram 400 illustrating the handset $120_i$ initialization performed by system 100 of FIG. 1, from the point of view of handset $120_i$, in accordance with an embodiment of the present invention. As will be appreciated, the processing flow in handset $120_i$ mirrors that in base unit 110, described above with reference to FIG. 3. Once the initial sign-on message is received correctly from the base (step 403), handset $120_i$ responds with an acknowledgment including old/new and related handset information (step 404). In particular, if the handset is new, it responds (step 404) with a message having the following fields filled in: message number field 201, message type field 202 (=1), new/existing handset field 203 (=0; "new"), and CRC field 209. If handset $120_i$ has already been initialized, it responds with a message having the following fields filled in: message number field 201, message type field 202, new/existing handset field 203 (=1; "preinitialized"), unique system D field 205, local slot number assignment field 204, scrambler seed field 207, and CRC field 209.

The rest of the processing chain shown in FIG. 4 (steps 405 et seq.) is a reflection of actions requested by the base. As discussed above, handset 120, needs to have a response for each of the possible states that it can be in. In particular, depending on its initial status (which is one of 3 possible conditions discussed in the previous section), the base may request the following actions: local slot number assignment (step 406); User to Provide Local Message Assignment (step 407); or HS vs. Base ID Mismatch (step 408) (implying a requirement for a possible reprogramming of the handset based on the user's request). This allows a handset to be recharged in another base with the user prompting such an action only. Also, in the case where only a recharging function is carried out, there is no unique ring tone at the completion of the action. All other actions in the handset on completion result in a unique ring tone (step 425) which signals to the user that the handset and base have completed their actions.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A wireless telephone system, comprising:
    (a) one or more wireless handsets, each handset comprising a handset transceiver; and
    (b) a base unit comprising:
        (1) a handset docking station having a wired interface;
        (2) means for initializing the handset via the wired interface, when the handset is physically docked in the docking station, by reading from the handset a unique handset security code based on but not the same as a unique handset serial number permanently stored in the handset and storing the unique handset security code locally to the base unit; and
        (3) a base transceiver for communicating over a channel with each handset via its handset transceiver only if the base unit determines, upon receipt of the handset security code for said handset from the handset, that the handset has previously been initialized by the base unit.

2. The system of claim 1, wherein:
the means for initializing further comprises means for providing to the handset a unique base unit security code based on a unique base unit serial number; and
the base transceiver is for communicating with a given handset only if the handset provides to the base unit the base unit security code and the handset security code.

3. The system of claim 2, wherein:
the base unit comprises means for determining whether the battery of the handset physically docked in the docking station has a voltage below a threshold level, wherein the means for initializing comprises means for waiting until after the battery voltage has been recharged above the threshold level before initializing the handset.

4. The system of claim 1, wherein:
the base transceiver comprises means for a time-division multiple access (TDMA) link with each handset via the handset transceiver in accordance with a TDMA epoch allocating exclusive audio packet time slots to each handset;
the means for initializing further comprises means for providing to the handset an exclusive audio packet slot number corresponding to its audio packet time slot; and
the base transceiver is for communicating with a given handset only if the handset provides to the base unit the handset security code and the audio packet slot number.

5. The system of claim 1, wherein:
the base unit and handset each comprise means for scrambling digital communications between the base transceiver and the handset in accordance with a scrambler seed unique to the handset that must be known to both the base transceiver and the handset; and
the means for initializing further comprises means for providing to the handset and for storing locally to the base unit the scrambler seed for the handset.

6. The system of claim 1, wherein:
each handset is battery powered by a rechargeable battery; and
the docking station comprises a charging means for recharging the battery of a handset physically docked in the docking station.

7. The system of claim 1, wherein the handset and base unit comprises means for exchanging initialization messages during the initialization in accordance with a message format comprising a plurality of fields.

8. The system of claim 1, wherein the base unit and the handset each comprise means for scrambling digital communications between the base transceiver and the handset in accordance with a scrambler seed unique to the handset that must be known to both the base transceiver and the handset, the base unit and the handset each comprise a memory device for storing the scrambler seed, the handset comprises the means for receiving the scrambler seed from a user of the handset when the handset is being initialized for storage in the memory device of the handset, and said means for initializing comprises means for reading the scrambler seed provided by the user of the handset from the memory device of the handset for storage in the memory device of the base unit.

9. A method for providing communication between a base unit of a wireless telephone system and on or more wireless handsets of the system, the base unit comprising a base transceiver and handset docking station having a wired interface, each handset comprising a handset transceiver, a method characterized by the steps of:

(a) initializing a handset via the wired interface, when the handset is physically docked in the docking station, by reading from the handset a unique handset security code based on but not the same as a unique handset serial number permanently stored in the handset and storing the unique handset security code locally to the base unit; and (b) conducting digital communications, over an RF channel, between the base unit and the handset via the base unit and handset transceivers, respectively, only if the base unit determines, upon receipt of the handset security code for said handset from the handset, that the handset has previously been initialized by the base unit.

10. The method of claim 9, wherein the base unit and the handset each comprise a memory device and means for scrambling digital communications between the base transceiver and the handset in accordance with a scrambler seed unique to the handset that must be known to both the base transceiver and the handset, and the method further comprises the steps of:

receiving, by the handset, the scrambler seed from a user of the handset when the handset is being initialized; and
storing the scrambler seed in the memory device of the handset,
wherein said initializing step comprises the step of reading the scrambler seed provided by the user of the handset from the handset, and the method further comprises the step of storing the scrambler seed in the memory device of the base unit.

11. A base unit for communication with one or more wireless handsets, each handset comprising a handset transceiver, comprising:

(a) a handset docking station having a wired interface, the base unit characterized by further comprising:

(b) means for initializing the handset via the wired interface, when the handset is physically docked in the docking station, by reading from the handset a unique handset security code based on but not the same as a unique handset serial number permanently stored in the handset and storing the unique handset security code locally to the base unit; and a base transceiver for communicating over a channel with each handset via its handset transceiver only if the base unit determines, upon receipt of the handset security code for said handset form the handset, that the handset has previously been initialized by the base unit.

12. The base unit of claim 11, wherein the base unit and the handset each comprise means for scrambling digital communications between the base transceiver and the handset in accordance with a scrambler seed unique to the handset that must be known to both the base transceiver and the handset, the base unit and the handset each comprise a memory device for storing the scrambler seed, the handset comprises the means for receiving the scrambler seed from a user of the handset when the handset is being initialized for storage in the memory device of the handset, and said means for initializing comprising means for reading the scrambler seed provided by the user of the handset from the memory device of the handset for storage in the memory device of the base unit.

* * * * *